(12) United States Patent  
Tanaka

(10) Patent No.: US 9,313,419 B2
(45) Date of Patent: Apr. 12, 2016

(54) IMAGE PROCESSING APPARATUS AND IMAGE PICKUP APPARATUS WHERE IMAGE PROCESSING IS APPLIED USING AN ACQUIRED DEPTH MAP

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 14/164,520

(22) Filed: Jan. 27, 2014

(65) Prior Publication Data

US 2014/0211045 A1   Jul. 31, 2014

(30) Foreign Application Priority Data

Jan. 31, 2013   (JP) ................................. 2013-016816
Dec. 13, 2013   (JP) ................................. 2013-258124

(51) Int. Cl.
*H04N 5/232*     (2006.01)
*H04N 5/262*     (2006.01)

(52) U.S. Cl.
CPC ......... *H04N 5/2621* (2013.01); *H04N 5/23212* (2013.01)

(58) Field of Classification Search
CPC ............... G06T 5/003; H04N 5/23212; G03B 2207/005; G03B 2217/005
See application file for complete search history.

(56) References Cited

U.S. PATENT DOCUMENTS

| 6,900,841 | B1 | 5/2005 | Mihara | |
|---|---|---|---|---|
| 2008/0002961 | A1* | 1/2008 | Sundstrom | 396/133 |
| 2009/0160963 | A1* | 6/2009 | Kim | 348/220.1 |
| 2010/0225780 | A1* | 9/2010 | Shimizu | 348/223.1 |
| 2011/0037877 | A1 | 2/2011 | Tamaru | |
| 2011/0205390 | A1* | 8/2011 | Yoshioka et al. | 348/223.1 |
| 2011/0279699 | A1* | 11/2011 | Matsui | 348/222.1 |
| 2012/0320230 | A1* | 12/2012 | Uehara | 348/222.1 |
| 2013/0033582 | A1* | 2/2013 | Sun et al. | 348/47 |
| 2013/0107002 | A1* | 5/2013 | Kikuchi | 348/46 |
| 2013/0113988 | A1* | 5/2013 | Wajs | 348/362 |
| 2013/0147843 | A1* | 6/2013 | Shimizu | 345/647 |
| 2013/0208093 | A1* | 8/2013 | Sun et al. | 348/46 |
| 2013/0230259 | A1* | 9/2013 | Intwala et al. | 382/255 |
| 2013/0308007 | A1 | 11/2013 | Tanaka | |

FOREIGN PATENT DOCUMENTS

| JP | 2000-207549 A | 7/2000 |
|---|---|---|
| JP | 2011-010194 A | 1/2011 |
| JP | 2011-041089 A | 2/2011 |
| JP | 2011-091570 A | 5/2011 |

* cited by examiner

*Primary Examiner* — Shahbaz Nazrul
(74) *Attorney, Agent, or Firm* — Fitzpatrick, Cella, Harper & Scinto

(57) ABSTRACT

An image processing apparatus has: a depth map acquiring unit configured to acquire a depth map that records information indicating a depth distance corresponding to each point on a photographed image; an in-focus position acquiring unit configured to acquire an in-focus position on the photographed image; a reference distance determining unit configured to acquire a depth distance corresponding to the in-focus position from the depth map and sets the acquired depth distance as a reference distance; and an image processing unit configured to perform image processing on the photographed image by using the depth map and the reference distance.

20 Claims, 11 Drawing Sheets

FIG.7
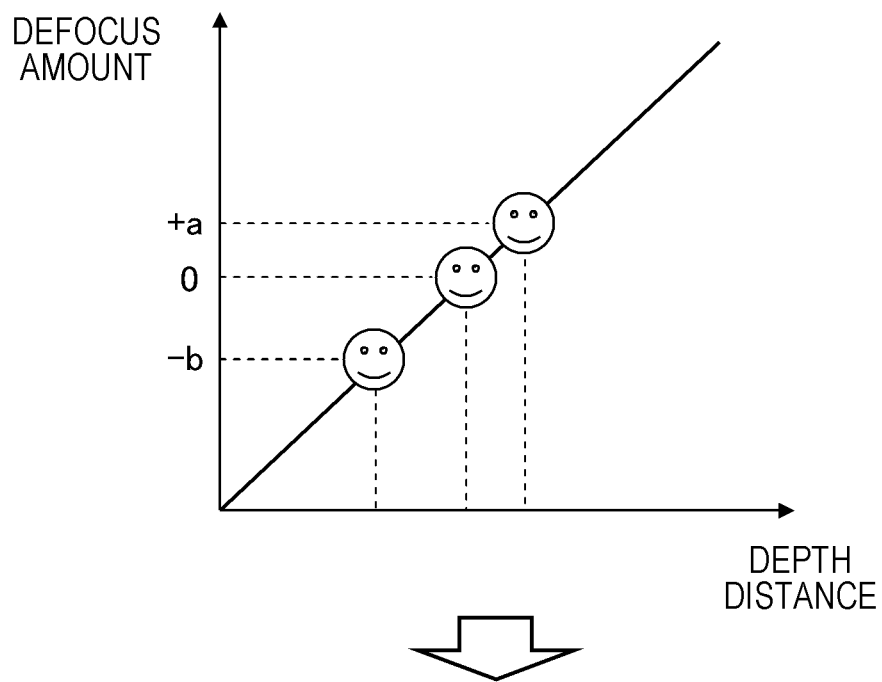
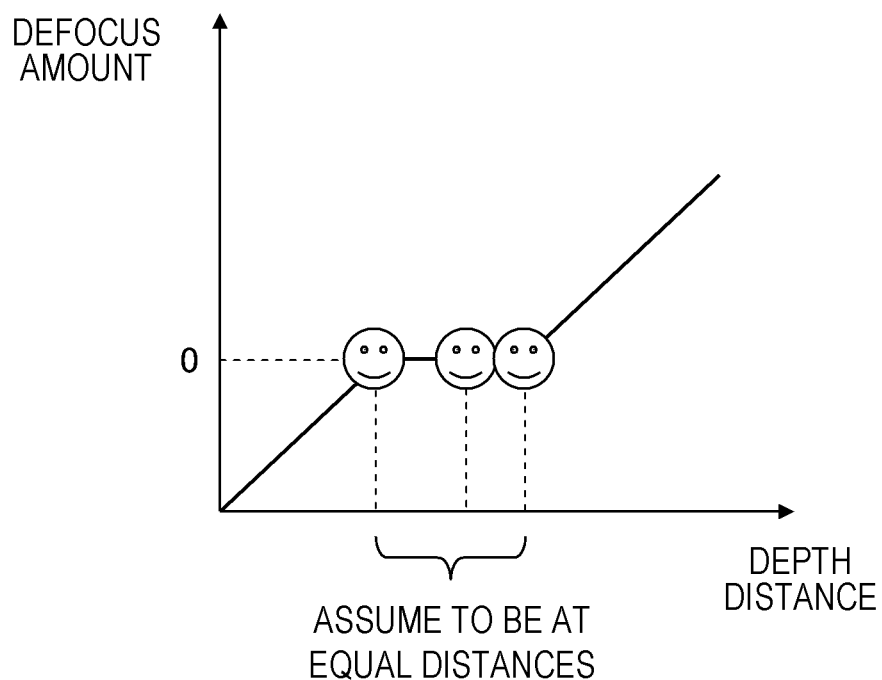

US 9,313,419 B2

IMAGE PROCESSING APPARATUS AND IMAGE PICKUP APPARATUS WHERE IMAGE PROCESSING IS APPLIED USING AN ACQUIRED DEPTH MAP

BACKGROUND OF THE INVENTION

1. Field of the Invention

The present invention relates to digital image processing and particularly to an image processing technique for performing image processing on a photographed image.

2. Description of the Related Art

A known photographic technique among various techniques of photography using a camera involves emphasizing a subject of interest by intentionally blurring portions other than the subject (such as a background). However, when performance of an optical system is not particularly high as in the case of a compact camera, a depth of field cannot be reduced and a sufficient blur cannot be created. In consideration thereof, techniques for generating an image with a blurred background or the like by subsequently adding a blur by digital image processing are recently being proposed. For example, an image pickup apparatus according to Japanese Patent Application Laid-open No. 2011-091570 determines a position on an image of a subject that is an in-focus object as a reference point and applies a blurring process so that the greater the distance on the image from the reference point, the greater the blur. In addition, Japanese Patent Application Laid-open No. 2000-207549 discloses an image processing apparatus that generates an image on which an appropriate blurring effect is applied based on data of a three-dimensional image photographed using a three-dimensional measurement camera and on virtual camera parameters and a focal position specified by a user.

In the method disclosed in Japanese Patent Application Laid-open No. 2011-091570, a size of a blur is determined in accordance with a position on an image instead of a depth distance. Therefore, there is a possibility of generating an unnatural image in which, for example, a blur is added to an object even if a depth distance of the object is the same as that of an in-focus object (in other words, even if the object exists at a focal position). On the other hand, although the method disclosed in Japanese Patent Application Laid-open No. 2000-207549 is conceivably capable of producing a high-quality blurred image, the method requires the use of a three-dimensional measurement camera that is a special apparatus. Therefore, it is difficult to apply the method to general small-sized cameras and the like. Another problem is that conditions such as camera parameters and a focal position must be specified by the user which makes handling difficult.

In consideration thereof, the present inventors have considered photographing an image by generating data that records a depth distance of each point in the image (this data will be referred to as a depth map or a distance map) and using the depth map in a blur adding process. Once a focal position (an in-focus distance) of a photographed image is known from autofocus information, a deviation (defocus amount) from a focal position at each point in the image can be calculated by calculating a difference between the focal position (the in-focus distance) and distance information of each point on the depth map. By controlling a size of a blur based on the defocus amount, an image in which blurring increases as a deviation from a focal position increases can be generated while maintaining sharpness of an in-focus object at the focal position.

However, in furthering the consideration, the present inventors discovered that the method described above has the following problems. Although a depth map can be created by, for example, various methods including a depth from defocus (DFD) method and a stereo method, in either case, an error is created in a distance estimation result due to the influence of noise and spatial frequency. A detailed description will now be given with reference to FIG. 11. It is assumed that a sphere 80, a trigonal pyramid 81, and a column 82 are respectively placed at positions of 3 m, 4 m, and 10 m from a camera, and photography is performed and a depth map is created by bringing the sphere 80 into focus. Reference numeral 83 denotes a photographed image and reference numeral 84 denotes an example of a depth map. While the depth map 84 contains records of measurement results with respect to 24 (4×6) areas, a certain amount of error is created as compared to actual object distances. Reference numeral 85 denotes defocus amounts of the respective areas calculated based on the depth map 84 and a focal position (3 m) obtained from autofocus information. Due to the errors in the depth map, a defocus amount of an area (a dotted portion) of the sphere 80 that is an in-focus object has exceeded a defocus amount of an area (a hatched portion) of the trigonal pyramid 81 that is in the background. Adding a blur in accordance with such defocus amounts causes the sphere 80 that is a subject brought into focus by a photographer to blur and generates a blurred image 86 that is contrary to the intention of the photographer.

In addition to a blur adding process, similar problems arise with respect to, for example, a trimming process of a subject. In other words, when the intention is to trim (crop) the area (the dotted portion) of the sphere 80 that is an in-focus object using the depth map 84 and the focal position obtained from autofocus information, the area (the hatched portion) of the trigonal pyramid 81 with a small defocus amount ends up being trimmed. As a result, a subject intended by the photographer cannot be trimmed.

SUMMARY OF THE INVENTION

The present invention has been made in consideration of the circumstances described above and an object thereof is to provide a technique for performing high-quality image processing that reflects the intention of a photographer.

The present invention in its first aspect provides an image processing apparatus comprising: a depth map acquiring unit configured to acquire a depth map that records information indicating a depth distance corresponding to each point on a photographed image; an in-focus position acquiring unit configured to acquire an in-focus position on the photographed image; a reference distance determining unit configured to acquire a depth distance corresponding to the in-focus position from the depth map and sets the acquired depth distance as a reference distance; and an image processing unit configured to perform image processing on the photographed image by using the depth map and the reference distance.

The present invention in its second aspect provides an image pickup apparatus comprising an imaging unit and the image processing apparatus according to the present invention, wherein the image processing apparatus performs image processing on a photographed image that is photographed by the imaging unit.

The present invention in its third aspect provides an image processing method in which an image processing apparatus executes the steps of: acquiring a depth map that records information indicating a depth distance corresponding to each point on a photographed image; acquiring an in-focus position on the photographed image; acquiring a depth distance corresponding to the in-focus position from the depth map and setting the acquired depth distance as a reference distance; and performing image processing on the photographed image by using the depth map and the reference distance.

The present invention in its fourth aspect provides a non-transitory computer readable storage medium storing a program that causes an image processing apparatus to execute the respective steps of the image processing method according to the present invention.

The present invention in its fifth aspect provides an image processing apparatus comprising: a depth map acquiring unit configured to acquire a depth map that records information indicating a depth distance corresponding to each point on a photographed image; an in-focus position acquiring unit configured to acquire an in-focus position on the photographed image; and a reference distance determining unit configured to acquire a depth distance corresponding to the in-focus position from the depth map and sets the acquired depth distance as a reference distance.

According to the present invention, high-quality image processing that reflects the intention of a photographer can be performed. Further features of the present invention will become apparent from the following description of exemplary embodiments with reference to the attached drawings.

BRIEF DESCRIPTION OF THE DRAWINGS

FIG. 7 is a diagram for explaining adjustment of a defocus amount according to a fourth embodiment;

DESCRIPTION OF THE EMBODIMENTS

The present invention relates to a technique of using a depth map to add a blur to a photographed image in accordance with a depth distance, to distinguish a subject from a background, to trim (crop) a subject from the photographed image, and the like. This technique is implemented as one of the functions of an image processing apparatus (an image processing engine) that is mounted on an image pickup apparatus such as a digital camera and a digital video camera and is used in image processing such as a process of adding a blurred effect to a photographed image with a deep depth of field, a process of distinguishing a subject from a background and a process of trimming a subject from the photographed image.

In the present specification, the term "in-focus region" refers to a region on an image in which an image of a subject that is in focus exists, and the term "in-focus position" refers to a position (an XY position) of the in-focus region on the image. In addition, an "in-focus distance" refers to a distance between a subject that is in focus and a camera in an optical axis direction (a Z direction) of an imaging optical system and is synonymous with "focal position". A "focal distance" refers to a distance between a principal point and a focal point of the imaging optical system and is a parameter generally denoted by f.

<First Embodiment>
(Configuration of Image Pickup Apparatus)

Figure 1:
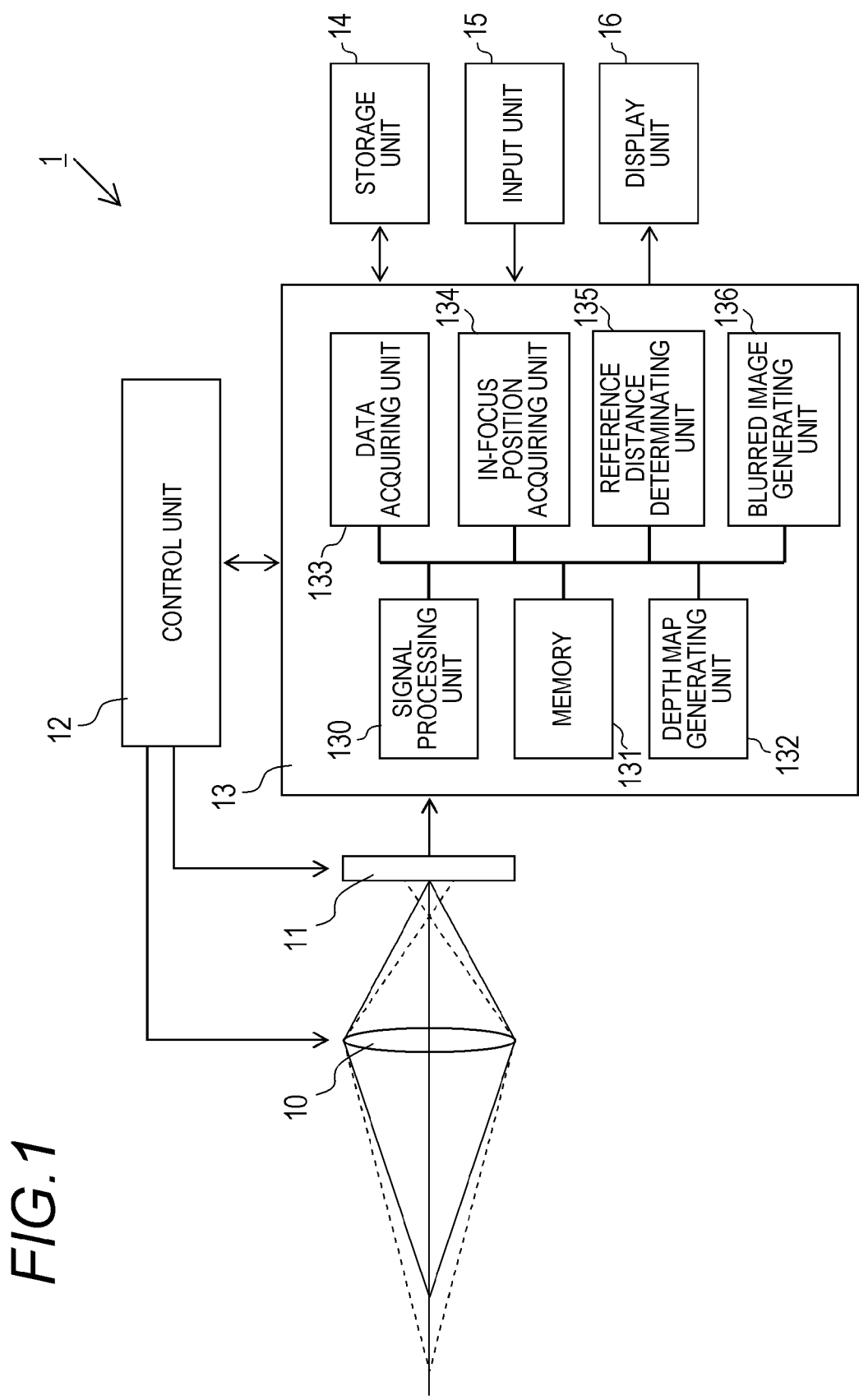
FIG. 1 is a diagram showing a configuration of an image pickup apparatus according to a first embodiment.

FIG. 1 is a diagram schematically showing a configuration of an image pickup apparatus according to a first embodiment of the present invention. An image pickup apparatus 1 includes an imaging optical system 10, an imaging element 11, a control unit 12, an image processing apparatus 13, a storage unit 14, an input unit 15, and a display unit 16.

The imaging optical system 10 is an optical system which is constituted by a plurality of lenses and which enables incident light to form an image on an imaging plane of the imaging element 11. A variable focus optical system is used as the imaging optical system 10, and thus automatic focusing can be performed by an autofocus function of the control unit 12. The autofocusing may adopt a passive system or an active system. The imaging element 11 is an imaging element including an image sensor such as a CCD or a CMOS. Alternatively, an imaging element having a color filter, a monochromatic imaging element, or a 3-CCD imaging element may be used.

The image processing apparatus 13 includes a signal processing unit 130, a memory 131, a depth map generating unit 132, a data acquiring unit 133, an in-focus position acquiring unit 134, a reference distance determining unit 135, a blurred image generating unit 136, and the like. The signal processing unit 130 is a function for performing various image processing such as A/D conversion, noise reduction, demosaicing, brightness signal conversion, aberration correction, white balance adjustment, and color correction on an analog signal outputted from the imaging element 11. Digital image data outputted from the signal processing unit 130 is stored in the memory 131 and is displayed by the display unit 16, recorded (saved) by the storage unit 14, used for distance measurement (depth map generation), and the like. The depth map generating unit 132 is a function for using images which are photographed at different photographic conditions and which have different blur to calculate a depth distance of each point in the images and generate a depth map. A depth map generated by the depth map generating unit 132 is stored in the storage unit 14 or the like. The data acquiring unit 133 includes a function (an image acquiring function) of reading data of a photographed image that is an object of a blur adding process from the storage unit 14 and a function (a depth map acquiring function) of reading corresponding data in a depth map from the storage unit 14. The in-focus position acquiring unit 134 is a function of acquiring an in-focus position on the photographed image. The reference distance determining unit 135 is a function of determining a depth distance (a reference distance) to be used as a reference in a blur adding process. The blurred image generating unit 136 is a function of adding a blur to the photographed image based on a depth map. Details of the image processing apparatus 13 will be described later.

The storage unit 14 is a non-volatile storage medium that stores data of photographed images, data of depth maps, parameter data to be used by the image pickup apparatus 1, and the like. Any type of storage medium may be used as the storage unit 14 as long as the storage medium has a large capacity and enables reading and writing at high speed.

Favorable examples include a flash memory and a DRAM. The input unit 15 is an interface that is operated by a user to input information and change settings with respect to the image pickup apparatus 1. For example, a dial, a button, a switch, a touch panel, and the like can be used. The display unit 16 is a display unit that is constituted by a liquid crystal display, an organic EL display, or the like. The display unit 16 is used to check composition during photography, view photographed and recorded images, display various setup screens and message information, and the like. The control unit 12 is a function of controlling the various parts of the image pickup apparatus 1. Examples of functions of the control unit 12 include automatic focusing (AF), changing focus positions, changing F values (apertures), capturing images, controlling a shutter and flash (both not shown), and controlling the storage unit 14, the input unit 15, and the display unit 16.

(Processing Flow)

Figure 2:
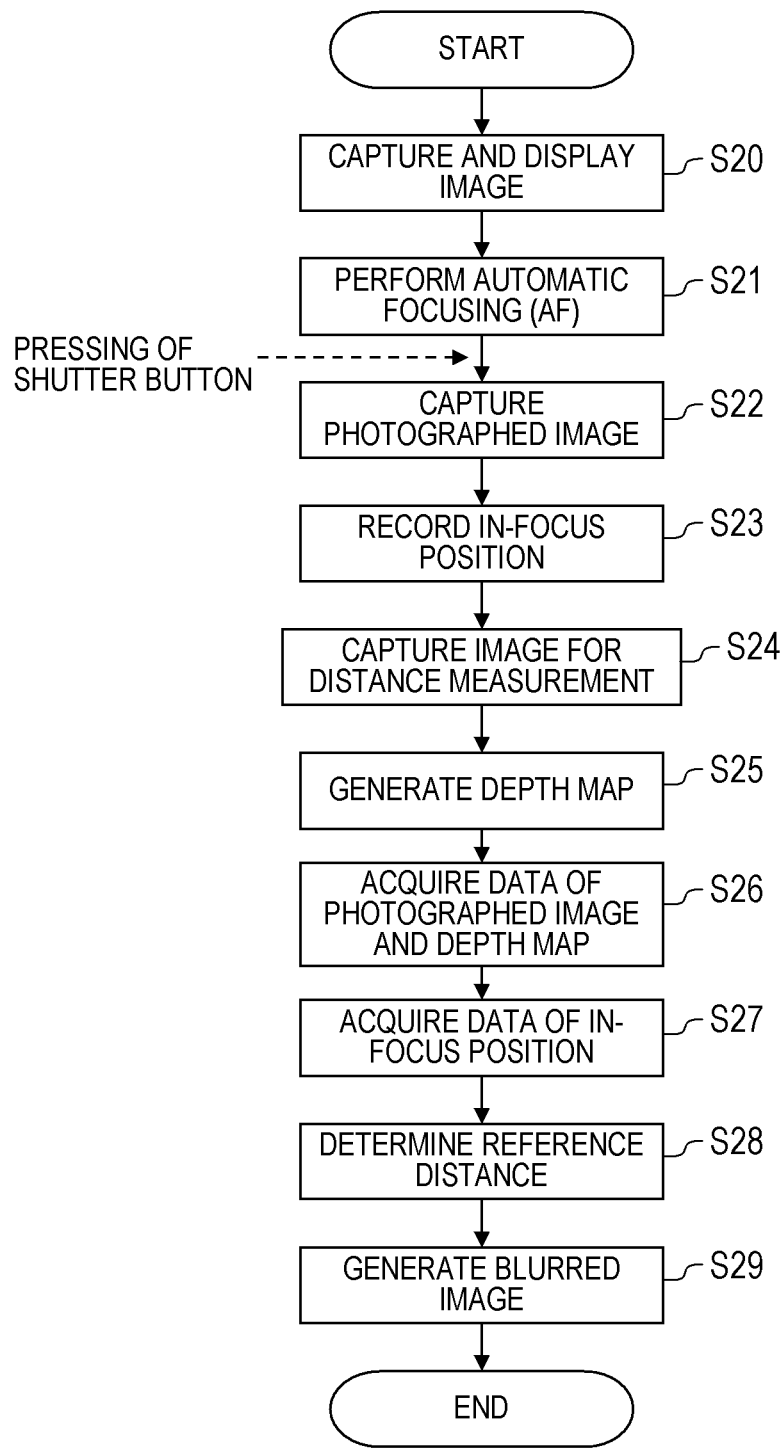
FIG. 2 is a flow chart showing a flow of a blurred image photographing process according to the first embodiment.

Next, operations of the image pickup apparatus 1 will be described with reference to FIG. 2. FIG. 2 is a flow chart showing a flow of a blurred image photographing process performed by the image pickup apparatus 1.

When a user (photographer) operates the input unit 15 to set a blurred image photographing mode, capturing of images is started from the imaging element 11 and the images acquired via the signal processing unit 130 and the memory 131 are sequentially displayed on the display unit 16 (step S20). The user brings a desired subject into focus by automatic focusing while checking a composition on the display unit 16 (step S21), and a photographed image is captured when a shutter button is pressed (step S22). The acquired data is stored in the storage unit 14.

At this point, the control unit 12 records information on a range-finding point (range-finding frame) that had been used to bring the subject into focus during automatic focusing as an in-focus position (step S23). An in-focus position is given by, for example, a coordinate value (XY) in an image coordinate system. An in-focus position may be defined by a coordinate value of a single point or by coordinate values of two points at upper left and lower right positions in a frame. Alternatively, if a correspondence between numbers of range-finding points and coordinates is determined in advance, a number of a range-finding point may be recorded instead of a coordinate value as an in-focus position.

Subsequently, the control unit 12 captures an image for distance measurement to be used to generate a depth map (step S24). Since the DFD method is used in the present embodiment, two images with different blur are required to calculate a depth distance. Therefore, the control unit 12 photographs an image for distance measurement by slightly moving a focus position from the time of photography in step S22. It is assumed that photographic conditions (an amount of movement of the focus position, an F value, and the like) which are applied at this point are set in advance.

Next, the depth map generating unit 132 estimates a depth distance of each point on the image by the DFD method based on a difference between the photographed image and the image for distance measurement and generates a depth map (step S25). The estimation of a depth distance can be performed per pixel, performed discretely, or performed per area. A resolution of the depth map may be appropriately designed in consideration of a balance among required precision, processing speed, data capacity, and the like. Hereinafter, for the sake of simplicity, a depth map with 24 (4×6) areas will be exemplified. The generated depth map is stored in the storage unit 14. Moreover, besides the DFD method, a stereo method in which a distance is estimated based on the principle of triangulation using two images with having a parallax therebetween, a TOF method in which a distance to an object is directly measured by ultrasonic waves or infrared rays, and the like can be used to generate the depth map. Since all of these methods are known, a detailed description thereof will be omitted herein.

Figure 3:
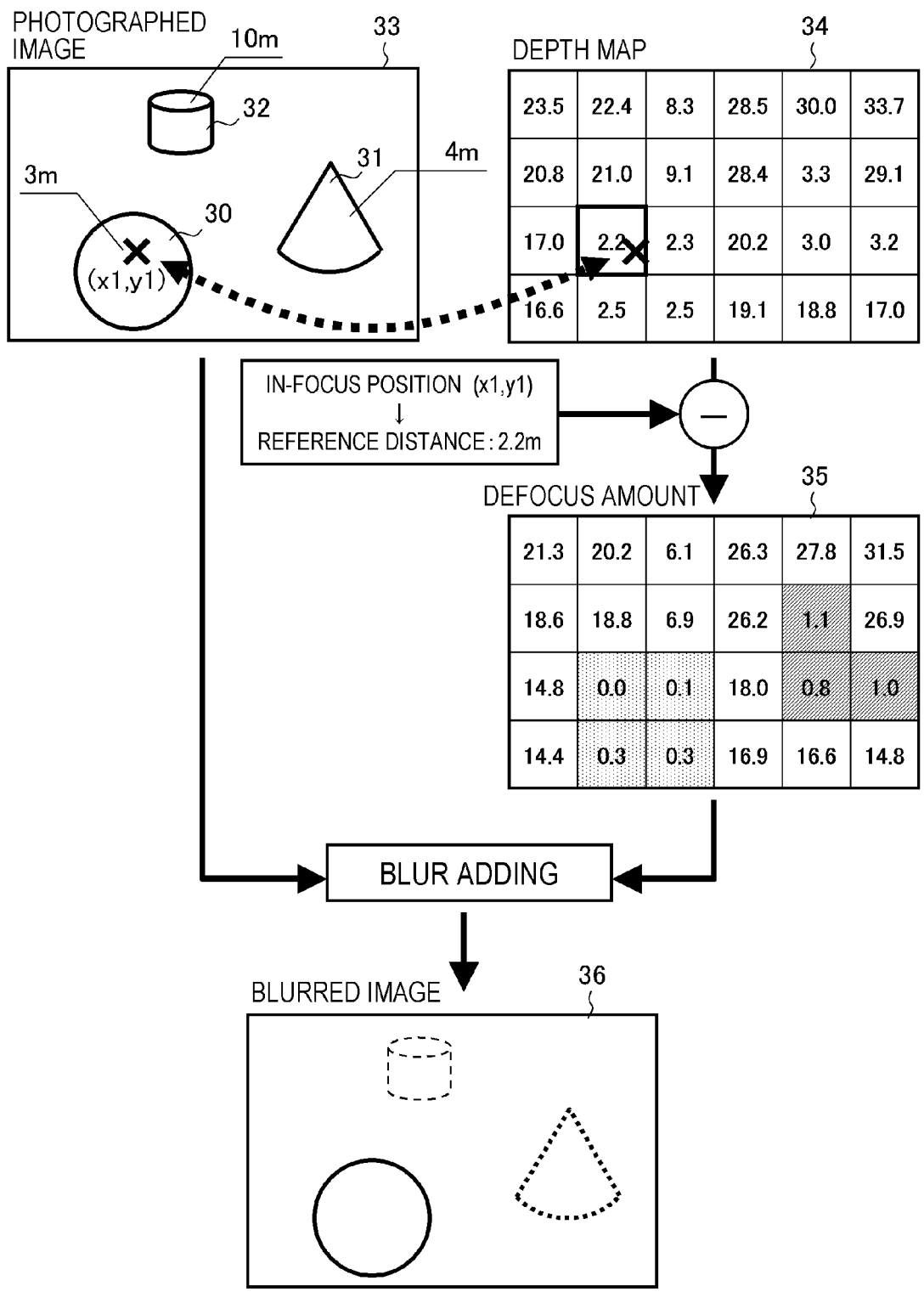
FIG. 3 is a diagram for explaining a method of generating a blurred image from a photographed image and a depth map.
Figure 11:
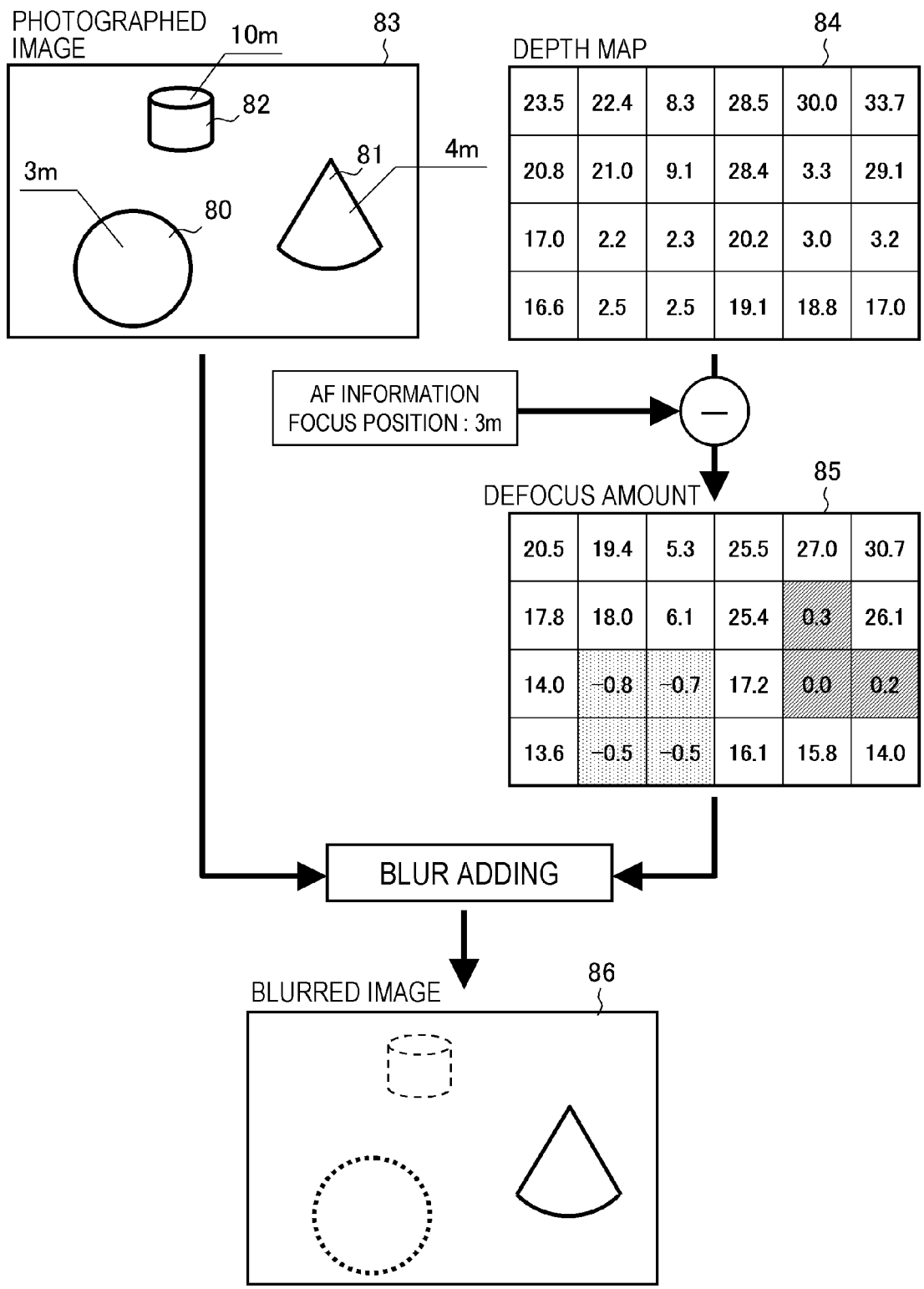
FIG. 11 is a diagram for explaining problems created by errors in a depth map.

FIG. 3 shows examples of an image 33 photographed in step S22 and a depth map 34 generated in step S25. In a similar manner to FIG. 11, it is assumed that a sphere 30, a trigonal pyramid 31, and a column 32 are respectively placed at positions of 3 m, 4 m, and 10 m from the image pickup apparatus 1, and photography is performed by bringing the sphere 30 into focus. While the depth map 34 contains records of depth distances with respect to 24 (4×6) areas, it is shown that a certain amount of error is created as compared to actual object distances. This is because errors in distance estimation occur due to various influences such as a spatial frequency of a subject, lighting conditions, various types of noise, and an aberration of the optical system. Moreover, while values of an object distance at the respective points (in the respective areas) are recorded as-is in the depth map shown in FIG. 3, any kind of information may be recorded as long as such information has a correspondence with depth distances. For example, a distance on an image plane side (a defocus amount), a distance on an object side, or an index value (a score) obtained by a distance calculation according to the DFD method may be recorded. In particular, storing information regarding the image plane side is favorable because a correction conforming to a blurring effect can be made by a simple offset when correcting the errors contained in the depth map. Moreover, when object-side information is stored, a further operation of conversion using information (longitudinal magnification or the like) of the optical system must be performed in advance.

Next, a process of applying a blurring effect on the photographed image 33 using the depth map 34 is performed. First, the data acquiring unit 133 acquires data of the photographed image 33 and data of the depth map 34 from the storage unit 14 (step S26). Next, the in-focus position acquiring unit 134 acquires data on the in-focus position recorded in step S23 from the control unit 12 (step S27). Subsequently, the reference distance determining unit 135 acquires a depth distance corresponding to the in-focus position from the depth map 34 and sets the depth distance as a reference distance (step S28). In the example shown in FIG. 3, since a coordinate (x1, y1) of the in-focus position belongs to a second from left and third from top area on the depth map 34, a value "2.2 m" of the depth distance of the area is selected as the reference distance. A reference distance refers to a depth distance that is assumed as an in-focus distance (focal position) in a blur adding process to be performed later.

Moreover, a method of determining a reference distance is not limited to the example described above. For example, while a reference distance is determined based on a depth distance of only one point (one area) in FIG. 3, a reference distance may be determined based on depth distances of a plurality of points. By calculating an average, a linear interpolation, a mode value, a median value, or the like of depth distances of a plurality of points and selecting the calculated value as a reference distance, an effect of reducing the influence of noise can be expected. This method is particularly advantageous when the resolution of the depth map is high. When an in-focus position is specified by the coordinate of a single point as in FIG. 3, depth distances of a plurality of points included in a prescribed range centered on the coordinate may be used. In addition, when an in-focus position is specified by area, depth distances of a plurality of points included in the area may be used.

Next, the blurred image generating unit 136 adds a blur in accordance with the depth distance based on the depth map to the photographed image (step S29). At this point, the blurred image generating unit 136 assumes the reference distance obtained in step S28 to be the in-focus distance (the focal position) and does not add a blur to areas whose values on the depth map are equal to the reference distance. On the other hand, with respect to areas whose values on the depth map deviate from the reference distance, the blurred image generating unit 136 controls blur amounts so that a blur increases in accordance with a deviation from the reference distance (a defocus amount). As is obvious from a comparison with the defocus amount 85 shown in FIG. 11, by calculating a defocus amount 35 using the reference distance as a reference, a region of an object (the sphere 30) corresponding to the in-focus position has a smallest defocus amount. In addition, it is shown that the defocus amount is obtained in accordance with a relative distance between objects. As a result, as shown in FIG. 3, a contrast of the sphere 30 that is an object at the reference distance is maintained and blur is added to the trigonal pyramid 31 and the column 32 which are at deeper positions than the sphere 30 in accordance with their respective defocus amounts. The generated blurred image 36 is displayed on the display unit 16 and, at the same time, stored in the storage unit 14.

(Control of Blur Amount)

Hereinafter, an example of a method of determining a blur amount in the process of step S29 will be described.

Figure 4:
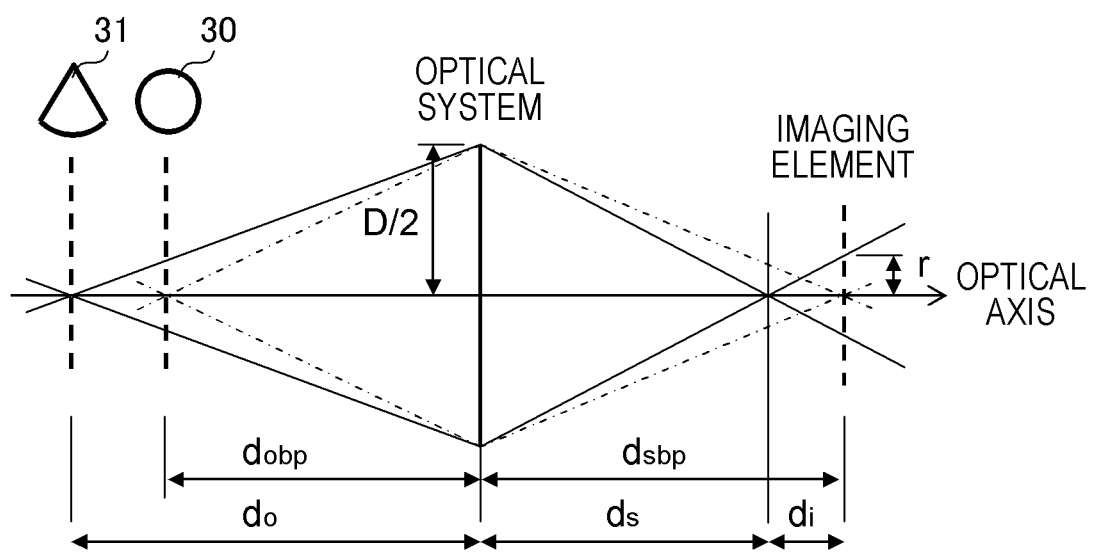
FIG. 4 is a diagram for explaining a method of determining a blur amount.

FIG. 4 shows a blur amount (a blur size r) on an image plane of an object (the trigonal pyramid 31) existing at a position that deviates from the reference distance (the sphere 30). In FIG. 4, do denotes an object distance of the trigonal pyramid 31, ds denotes an image plane distance of the trigonal pyramid 31, dobp denotes a reference distance (object side), dsbp denotes a reference distance (image plane side), D denotes a pupil size, and di denotes a defocus amount (image plane side). In addition, a focal distance of the optical system is denoted by f and an F value is denoted by Fno.

From a geometric relationship shown in FIG. 4 and a relationship expressed as $$D = \frac{f}{F_{no}},$$

the blur size r may be expressed as follows.

$$r = \frac{1}{2F_{no}} \frac{d_o - f}{d_o} d_i \quad (1)$$

$$d_i = d_{sbp} - \frac{fd_o}{d_o - f} \quad (2)$$

$$d_{sbp} = \frac{fd_{obp}}{d_{obp} - f} \quad (3)$$

When object distances are recorded in the depth map as in the example shown in FIG. 3, from equations (2) and (3), an image plane side defocus amount di can be calculated based on the reference distance (object side) dobp and the object distance do of the trigonal pyramid 31. Subsequently, by substituting the defocus amount di and the object distance do of the trigonal pyramid 31 into equation (1), the blur size r of the trigonal pyramid 31 can be determined. As for the focal distance f and the F value Fno, conditions at the time of photography may be used or the focal distance f and the F value Fno may be appropriately set. Once the blur size r is derived, a filter size can be uniquely decided from conditions of the imaging element. By performing this process on all pixels (or areas) in the image, a blur in accordance with defocus amounts can be added.

(Advantages of Present Embodiment)

With the method according to the present embodiment described above, since a value in a depth map corresponding to an in-focus position at the time of photography is selected as a reference distance, an image of an object that is brought into focus by the user is maintained in an in-focus state even after adding the blur and a blurred image in accordance with the user's intention is obtained. In addition, since a blur amount is controlled in accordance with a deviation of a depth distance with respect to the reference distance, a natural blurring effect as though actually photographed by an optical system can be expressed in which an object at a same distance as the reference distance is not blurred and the greater the deviation from the reference distance, the greater the blur. A further advantage is that, since a parameter (the in-focus position) necessary for a blur adding process is automatically acquired, an operation burden on the user is reduced. Moreover, these effects are valid regardless of the magnitude of errors contained in the depth map. Therefore, the method according to the present embodiment is particularly advantageous in cases where the errors contained in the depth map are relatively large such as when generating a depth map by image processing using the DFD method or the stereo method or when the depth distances in the depth map are multivalued information instead of binary information.

<Second Embodiment>

Next, a second embodiment of the present invention will be described. While a coordinate of a range-finding point of autofocus is used as an in-focus position in the first embodiment, this method is problematic when performing focus-locked photography. Focus-locked photography refers to a technique in autofocus which involves performing photography by shifting a composition while keeping a focal position fixed. For example, by bringing a subject at the center of a screen into focus by automatic focusing and subsequently turning the camera to the right while half-pressing a shutter button, photography can be performed in a composition where the subject is positioned at a left end of the screen while keeping the distance of the subject in focus. In this case, since a coordinate of a range-finding point (the center of the screen) and a coordinate of an in-focus region (the left end of the screen) do not match, referencing the depth map based on the coordinate of the range-finding point as in the first embodiment results insetting an inappropriate reference distance.

Figure 5:
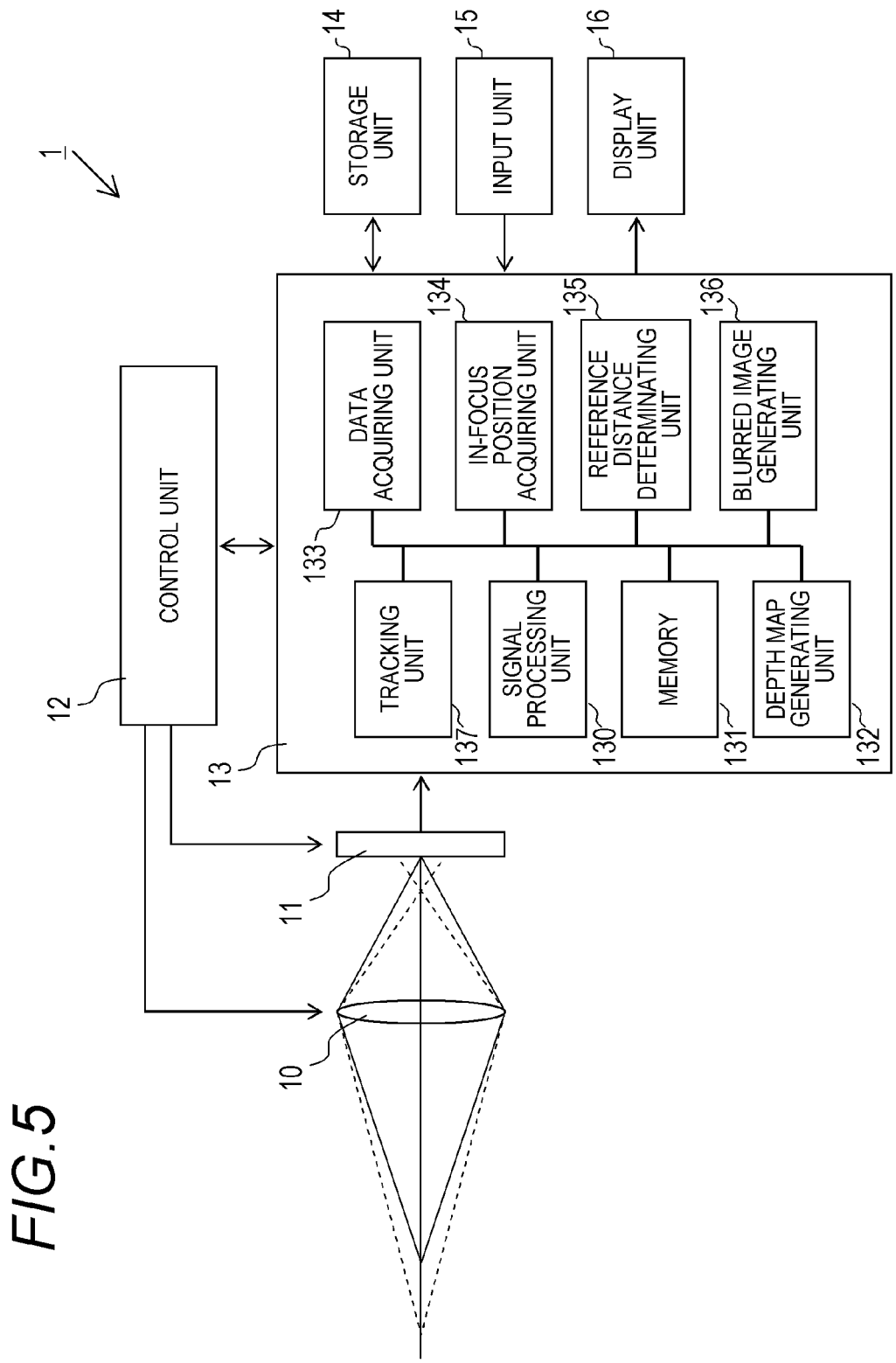
FIG. 5 is a diagram showing a configuration of an image pickup apparatus according to a second embodiment.

FIG. 5 is a diagram schematically showing a configuration of the image pickup apparatus 1 according to the second embodiment. The second embodiment differs from the first embodiment in that the image processing apparatus 13 includes a tracking unit 137. Operations of the tracking unit 137 will now be described with reference to the flow chart in FIG. 6.

Figure 6:
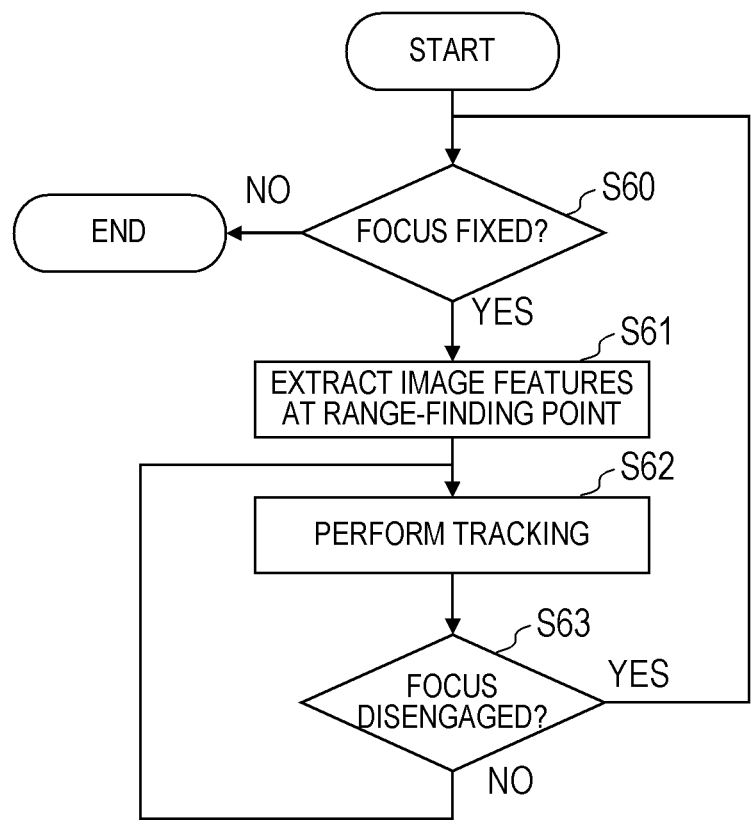
FIG. 6 is a flow chart showing processing by a tracking unit according to the second embodiment.

Once the user (the photographer) sets the image pickup apparatus 1 to the blurred image photographing mode and brings a desired subject into focus by automatic focusing (heretofore, the same as steps S20 and S21 in FIG. 2), a tracking routine shown in FIG. 6 is executed. First, the tracking unit 137 determines whether or not focus is fixed (step S60), and if not, the tracking unit 137 exits the routine and a normal automatic focusing operation is restored. When the focus is fixed by half-pressing the shutter button or the like (YES in step S60), the tracking unit 137 stores features and an initial position of the subject in focus (step S61). For example, image features are extracted from a local region including the range-finding point (the range-finding frame) used for focusing and are recorded together with a coordinate value of the range-finding point.

Subsequently, the tracking unit 137 tracks the subject that is a tracking object based on the image features. Specifically, every time an image for checking composition (a live view image) is captured, the tracking unit 137 detects the tracking object by searching the image for a region with matching or similar image features. When the tracking object is found, a position (coordinate value) thereof is updated. The tracking unit 137 continues tracking the tracking object until the focus is disengaged (step S63). Moreover, when the user fully-presses the shutter button, an interrupt occurs to exit the tracking routine and to proceed to step S22 in FIG. 2. After a photographed image is captured in step S22, in step S23, a recorded position of the tracking object (a position at the time of photography) is set as an in-focus position by the tracking unit 137. Processes thereafter are the same as those in the first embodiment.

Even with the configuration of the second embodiment described above, effects similar to those of the first embodiment can be produced. In addition, since the second embodiment is configured to automatically track an object used for focusing and to record the position of the object at the time of photography as an in-focus position, a blurred image in accordance with the user's intention is obtained even when focus-locked photography is performed.

<Third Embodiment>

Next, a third embodiment of the present invention will be described. In the first and second embodiments, an in-focus position is acquired from autofocus information at the time of photography. In contrast, in the third embodiment, a prescribed object is detected from a photographed image and the detected position is assumed to be an in-focus position. The prescribed object may be any object as long as there is a high probability of the object being selected by the user as a subject. For example, a face, a half body, or a full body of a person is envisioned. This is because a face or a half body of a person is almost always brought into focus when photographing a portrait or taking a group photograph. The present embodiment utilizes this tendency. Hereinafter, an example of detecting a face of a person will be described.

The third embodiment differs from the first embodiment in the operations of the in-focus position acquiring unit 134. Specifically, the in-focus position acquiring unit 134 analyzes a photographed image and detects a face of a person in the process of step S27 in FIG. 2. Since known techniques can be utilized as a method of detecting a face from an image, a detailed description thereof will be omitted. Subsequently, the in-focus position acquiring unit 134 sets a position on the image at which the face had been detected as the in-focus position. Processes thereafter are the same as those in the first embodiment. Moreover, when a plurality of faces are detected from an image, a face assumed to be an in-focus position may be selected based on sizes of the faces (for example, a biggest face), positions of the faces (for example, a face at the center of the image), or the like. Alternatively, a region containing the plurality of faces may be set as the in-focus position.

According to the configuration of the third embodiment described above, since an object (such as a face) with a high probability of being a subject is automatically detected and a blur is added only to regions other than the object, a blurred image in accordance with the user's intention can be automatically generated. The configuration of the third embodiment can be particularly favorably applied to cases where autofocus information at the time of photography is not available (for example, when generating a blurred image using image processing software on a PC).

<Fourth Embodiment>

Next, a fourth embodiment of the present invention will be described. The first to third embodiments only address one in-focus position. In contrast, in the fourth embodiment, an example of specifying a plurality of in-focus positions will be described. For example, a case is assumed where, when a plurality of faces are detected from an image in the method according to the third embodiment, positions of the respective faces are to be specified at different in-focus positions.

As shown in the upper half of FIG. 7, when positions of three faces in the image are respectively specified as in-focus positions, depth distances of the faces are not necessarily consistent with one another. Supposing that the depth distance of an intermediate face is selected as a reference distance and a same process as in the first embodiment is applied, then the faces in front and behind the intermediate face become blurred to produce a result that may differ from that desired by the user.

In consideration thereof, in the present embodiment, as shown in the lower half of FIG. 7, the blurred image generating unit 136 sets blur amounts at all in-focus positions to zero by calculating defocus amounts on the assumption that depth distances corresponding to a plurality of in-focus positions are all equal distances (reference distance). A simple method involves calculating a defocus amount d at each point (each area) on a depth map by a same method as in the first embodiment, subsequently adjusting the defocus amount d so that when d<−b: d←d+b,
when −b≤d≤a: d←0,
when d>a: d←d−a, and performing a blur adding process based on the adjusted defocus amount d.

According to the configuration of the present embodiment described above, when a plurality of in-focus positions are specified, an image can be generated in which all objects existing at depth distances corresponding to the in-focus positions are not blurred. In other words, a blurred image in which a depth of field is controlled so as to precisely include a distribution (variation) of depth distances of subjects respectively appearing at a plurality of in-focus positions can be automatically generated.

<Fifth Embodiment>

Next, a fifth embodiment of the present invention will be described. In the present embodiment, a technique of performing a distinguishing process of a subject from background of a photographed image will be described. Distinguishing of a subject refers to a technique in which only a subject of interest is distinguished from background of an image in order to trim the subject from the image. An image of the trimmed subject is used in, for example, image composition and image quality enhancement. A "distinguished image" means an image in which a subject is distinguished from background, and may be an image of a trimmed subject or an image including data (for example, a mask data) for distinguishing a subject from background.

Figure 8:
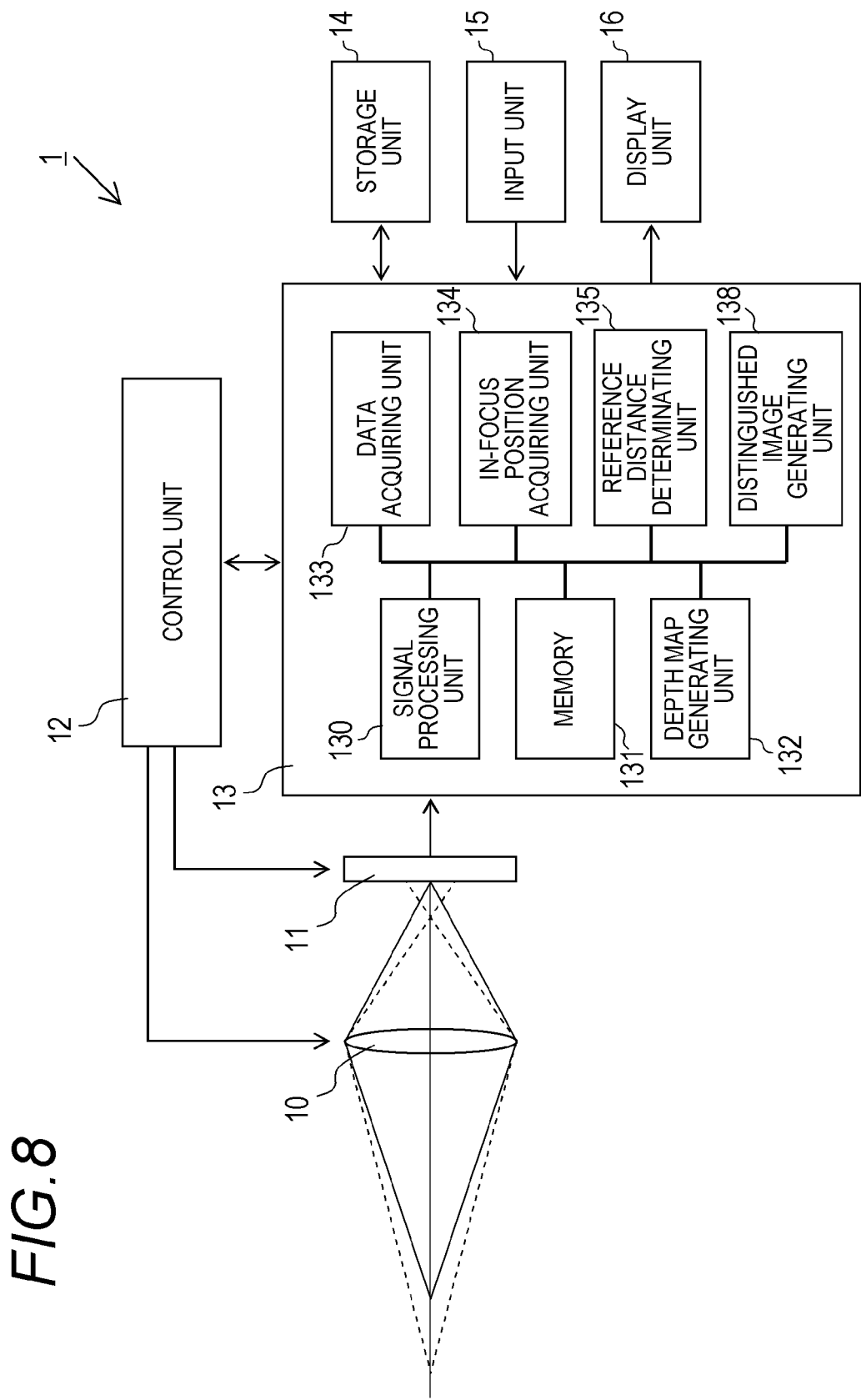
FIG. 8 is a diagram showing a configuration of an image pickup apparatus according to a fifth embodiment.

FIG. 8 is a diagram schematically showing a configuration of an image pickup apparatus according to the present embodiment. The image processing apparatus 13 according to the present embodiment differs from the image processing apparatus 13 according to the first embodiment (refer to FIG. 1) in that the image processing apparatus 13 includes a distinguished image generating unit 138 in place of the blurred image generating unit 136. The distinguished image generating unit 138 has a function of assuming an area included in a specific distance range based on a reference distance determined by the reference distance determining unit 135 as a same subject and distinguishing the subject from background of a photographed image. In other words, the distinguished image generating unit 138 is an image processing unit that performs image processing on a photographed image using a depth map and a reference distance.

For example, the specific distance range may or may not include a reference distance. When the reference distance is not included, the specific distance range is specified as, for example, "a range of reference distance+5 m or reference distance+6 m".

Methods of specifying the specific distance range include the user specifying an upper limit value and a lower limit value based on the reference distance and the user specifying a value of a distance range including a reference range. When the specific distance range is specified by the user, the user inputs numerical values such as the upper limit value and the lower limit value, a numerical value of the distance range, and the like using the input unit 15.

Figure 9:
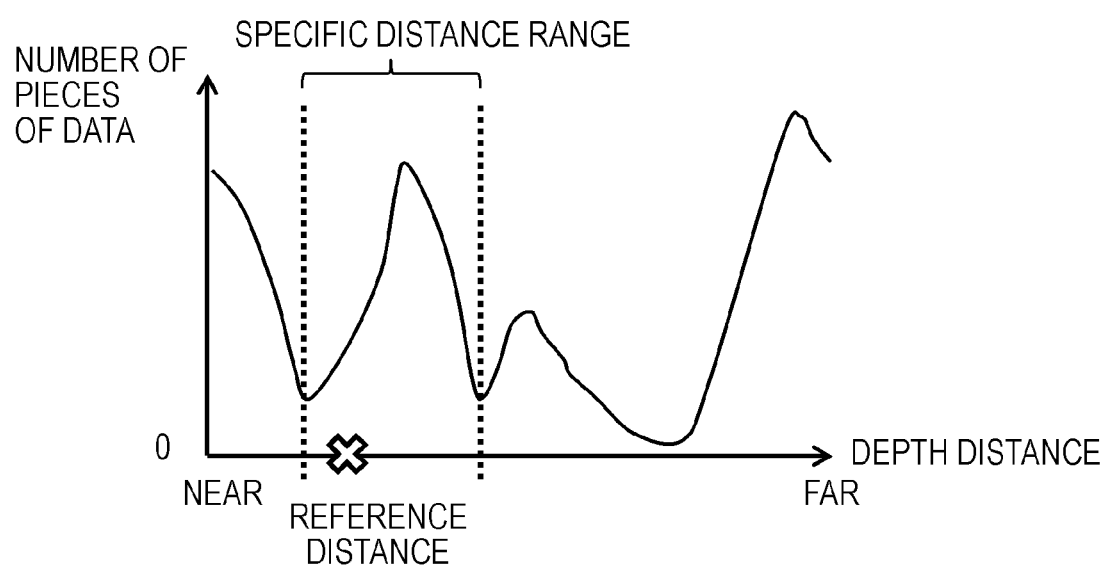
FIG. 9 is a histogram of depth distance.

Alternatively, the specific distance range may be determined in advance or may be automatically set from the depth map or other information in the image processing apparatus 13. For example, a method may be adopted in which a histogram of depth distance such as that shown in FIG. 9 is used to set a region between adjacent minimum values as the specific distance range so as to include the reference distance.

Figure 10:
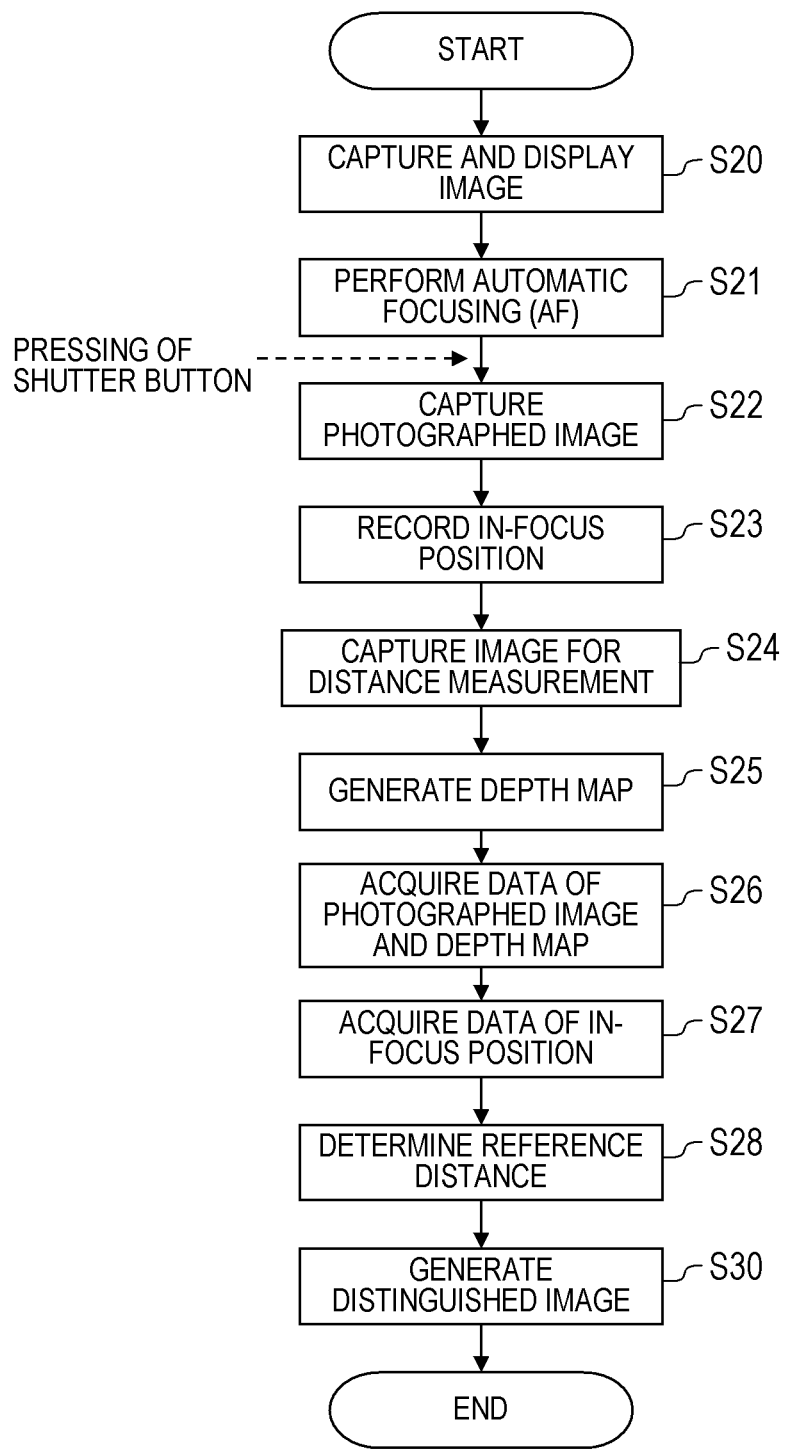
FIG. 10 is a flow chart showing a flow of a blurred image photographing process according to the fifth embodiment.

Next, operations of the image pickup apparatus 1 according to the present embodiment will be described with reference to FIG. 10. FIG. 10 is a flow chart showing a flow of a process of generating a distinguished image of a subject by the image pickup apparatus 1. Operations according to the present embodiment are the same as that according to the first embodiment up to step S28, and differs in that generation of a distinguished image (step S30) is included instead of generation of a blurred image (step S29).

In step S30, the distinguished image generating unit 138 distinguishes a subject included in the specific distance range from background, which is included in a photographed image and is not included in the specific distance range, using the depth map and the reference distance. At this point, when the user specifies the specific distance range, the user is requested by the distinguished image generating unit 138 to specify an upper limit value, a lower limit value, and a distance range based on the reference distance. For example, a guidance message of "please input distinguishing distance range" may be overlaid on the display unit 16.

Moreover, when a subject other than the subject that the photographer wishes to distinguish is included in the specific distance range, the subject may end up being included in the distinguished image. Therefore, in such cases, the distinguished image generating unit 138 may appropriately perform a process on the trimmed image for erasing the unwanted distinguished subject.

According to the configuration of the present embodiment described above, since a value in the depth map which corresponds to the in-focus position at the time of photography is selected as the reference distance, a distinguishing process is performed on a subject brought into focus by the user and a subject in accordance with the intention of the user is distinguished. In addition, since a same subject is determined based on a specific distance range with respect to the reference distance, a subject at a distance that is appropriately in focus can be distinguished even if the subject is at a separated position on the image.

For example, the technique according to the present invention described above can be favorably applied to image pickup apparatuses such as a digital camera and a digital camcorder as well as image processing apparatuses and computers which perform image processing on image data acquired by image pickup apparatuses. In addition, the technique according to the present invention can also be applied to various electronic devices (including mobile phones, smart phones, slate-type terminals, and personal computers) which incorporate such image pickup apparatuses or image processing apparatuses. Moreover, specific implementations to the apparatuses described above can be realized by both software (programs) and hardware. For example, various processes for achieving the object of the present invention may be realized by storing a program in a memory of a computer (a microcomputer, an FPGA, or the like) that is built into an image pickup apparatus or an image processing apparatus and by having the computer execute the program. Alternatively, a dedicated processor such as an ASIC which realizes all of or a part of the processes of the present invention using a logic circuit may be favorably provided.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed calculating systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-016816, filed on Jan. 31, 2013, and Japanese Patent Application No. 2013-258124, filed on Dec. 13, 2013, which are hereby incorporated by reference herein in their entirety.

What is claimed is:

1. An image processing apparatus comprising:
a depth map acquiring unit configured to acquire a depth map that records information indicating a depth distance corresponding to each point on a photographed image;
an in-focus position acquiring unit configured to acquire an in-focus position on the photographed image without an indication representing the in-focus position from a user;
a reference distance determining unit configured to acquire a depth distance corresponding to the in-focus position from the depth map and sets the acquired depth distance as a reference distance; and an image processing unit configured to perform image processing on the photographed image using the depth map and the reference distance.

2. The image processing apparatus according to claim 1, wherein the image processing unit comprises a blurred image generating unit configured to generate an image, in which an object other than an object existing at the reference distance is blurred, by adding a blur to the photographed image in accordance with a deviation of a depth distance with respect to the reference distance.

3. The image processing apparatus according to claim 1, wherein the image processing unit comprises a distinguished image generating unit configured to generate a distinguished image by distinguishing a subject included in a specific distance range from another subject, which is included in the photographed image and is not included in the specific distance range, using the depth map and the reference distance.

4. The image processing apparatus according to claim 1, wherein the reference distance determining unit acquires depth distances of a plurality of points corresponding to the in-focus position and determines the reference distance based on the depth distances of the plurality of points.

5. The image processing apparatus according to claim 1, wherein the in-focus position acquiring unit acquires the in-focus position from autofocus information at the time of photography of the photographed image.

6. The image processing apparatus according to claim 5, wherein the autofocus information is information on a range-finding point that was used during automatic focusing.

7. The image processing apparatus according to claim 1, wherein the information indicating a depth distance is image-plane-side information.

8. The image processing apparatus according to claim 1, further comprising
a tracking unit configured to track an object in focus, when the focus has been fixed during automatic focusing, to update a position of the object on an image, wherein
the in-focus position acquiring unit sets the position of the object on the image, which is obtained by the tracking unit at the time of photography of the photographed image, as the in-focus position.

9. The image processing apparatus according to claim 1, wherein the in-focus position acquiring unit detects a prescribed object from the photographed image by analyzing the photographed image and sets a position on the photographed image at which the prescribed object had been detected as the in-focus position.

10. The image processing apparatus according to claim 9, wherein the prescribed object is a face of a person.

11. The image processing apparatus according to claim 2, wherein when a plurality of in-focus positions are acquired by the in-focus position acquiring unit, the blurred image generating unit generates an image in which all objects existing at depth distances corresponding to the plurality of in-focus positions are not blurred.

12. The image processing apparatus according to claim 1, wherein the depth map contains depth distances in the form of multivalued information.

13. The image processing apparatus according to claim 1, wherein the depth map is generated by a depth from defocus (DFD) method or a stereo method.

14. An image pickup apparatus comprising an imaging unit and an image processing apparatus, wherein
the image processing apparatus comprises:
a depth map acquiring unit configured to acquire a depth map that records information indicating a depth distance corresponding to each point on a photographed image that is photographed by the imaging unit;
an in-focus position acquiring unit configured to acquire an in-focus position on the photographed image without an indication representing the in-focus position from a user;
a reference distance determining unit configured to acquire a depth distance corresponding to the in-focus position from the depth map and sets the acquired depth distance as a reference distance; and
an image processing unit configured to perform image processing on the photographed image using the depth map and the reference distance.

15. An image processing method in which an image processing apparatus executes the steps of:
acquiring a depth map that records information indicating a depth distance corresponding to each point on a photographed image;
acquiring an in-focus position on the photographed image without an indication representing the in-focus position from a user;
acquiring a depth distance corresponding to the in-focus position from the depth map and setting the acquired depth distance as a reference distance; and
performing image processing on the photographed image using the depth map and the reference distance.

16. The image processing method according to claim 15, wherein in the step of performing image processing, an image, in which an object other than an object existing at the reference distance is blurred, is generated by adding a blur in accordance with a deviation of a depth distance with respect to the reference distance to the photographed image.

17. The image processing method according to claim 15, wherein in the step of performing image processing, a distinguished image is generated by distinguishing a subject included in a specific distance range from background, which is included in the photographed image and is not included in the specific distance range, using the depth map and the reference distance.

18. A non-transitory computer readable storage medium storing a program that causes an image processing apparatus to execute the respective steps of acquiring a depth map that records information indicating a depth distance corresponding to each point on a photographed image;
acquiring an in-focus position on the photographed image without an indication representing the in-focus position from a user;
acquiring a depth distance corresponding to the in-focus position from the depth map and setting the acquired depth distance as a reference distance; and
performing image processing on the photographed image using the depth map and the reference distance.

19. An image processing apparatus comprising:
a depth map acquiring unit configured to acquire a depth map that records information indicating a depth distance corresponding to each point on a photographed image;
an in-focus position acquiring unit configured to acquire an in-focus position on the photographed image without an indication representing the in-focus position from a user; and
a reference distance determining unit configured to acquire a depth distance corresponding to the in-focus position from the depth map and sets the acquired depth distance as a reference distance.

20. An image processing apparatus comprising at least one processor and at least one memory, coupled to each other and operating to:

acquire a depth map that records information indicating a depth distance corresponding to each point on a photographed image;

acquire an in-focus position on the photographed image without an indication representing the in-focus position from a user;

acquire a depth distance corresponding to the in-focus position from the depth map and sets the acquired depth distance as a reference distance; and perform image processing on the photographed image using the depth map and the reference distance.

\* \* \* \* \*